(12) United States Patent
Kusaki et al.

(10) Patent No.: US 6,584,056 B1
(45) Date of Patent: Jun. 24, 2003

(54) DISK RECORDING AND/OR REPRODUCING DEVICE

(75) Inventors: Kenji Kusaki, Kanagawa (JP); Yasushi Tomita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/601,211
(22) PCT Filed: Nov. 30, 1999
(86) PCT No.: PCT/JP99/06716
§ 371 (c)(1),
(2), (4) Date: Sep. 12, 2000
(87) PCT Pub. No.: WO00/33305
PCT Pub. Date: Jun. 8, 2000

(30) Foreign Application Priority Data

Nov. 30, 1998 (JP) .......................................... 10-339864

(51) Int. Cl.⁷ .............................................. G11B 19/10
(52) U.S. Cl. ..................................................... 369/77.2
(58) Field of Search ............................... 369/77.2, 77.1, 369/75.1; 360/99.01, 99.02, 99.04, 97.01

(56) References Cited

U.S. PATENT DOCUMENTS

| 4,445,155 A | * | 4/1984 | Takahashi et al. | ........ 360/99.04 |
| 5,103,358 A | * | 4/1992 | Munekata | ................. 360/99.04 |
| 5,311,383 A | * | 5/1994 | Yokouchi | ................. 360/99.08 |
| 5,715,115 A | * | 2/1998 | Takarasawa et al. | ..... 360/99.05 |
| 6,246,539 B1 | * | 6/2001 | Sakaguchi | ............... 360/99.05 |
| 6,271,992 B1 | * | 8/2001 | Meguro | ....................... 360/133 |
| 6,297,931 B2 | * | 10/2001 | Tomita et al. | .............. 360/133 |

FOREIGN PATENT DOCUMENTS

| JP | 60-164955 | 8/1985 |
| JP | 2-50348 | 2/1990 |
| JP | 3-132966 | 6/1991 |
| JP | 3-224174 | 10/1991 |
| JP | 4-188458 | 7/1992 |
| JP | 8-293154 | 11/1996 |

* cited by examiner

*Primary Examiner*—William Korzuch
*Assistant Examiner*—Angel Castro
(74) *Attorney, Agent, or Firm*—Rader, Fishman & Grauer PLLC; Ronald P. Kananen

(57) ABSTRACT

A recording and/or reproducing apparatus for a disc-shaped recording medium having a rotary shaft and a driving pin provided at an offset position relative to this driving shaft, the rotary shaft being passed through a rotary shaft inserting opening formed in the disc-shaped recording medium and the driving pin being engaged in a driving pin engagement opening bored in the disc-shaped recording medium to set the rotational position of the disc-shaped recording medium run in rotation to record and/or reproduce information signals. The disc rotating driving unit is driven to displace the position of the driving pin from a position in which the rotary shaft inserting opening and the driving pin engagement opening in the disc-shaped recording medium are disengaged from the rotary shaft and the driving pin, respectively, at a timing when the rotary shaft and the driving pin are not engaged in the rotary shaft inserting opening and the driving pin engagement opening in the disc-shaped recording medium to prohibit the driving pin from overlapping with the rim of the driving pin engagement opening.

6 Claims, 5 Drawing Sheets

DISK RECORDING AND/OR REPRODUCING DEVICE

TECHNICAL FIELD

This invention relates to a disc recording and/or reproducing apparatus employing, as a recording medium, a disc cartridge housing a disc operating as an information signal recording medium, such as a magnetic disc. More particularly, it relates to a disc recording and/or reproducing apparatus having a disc rotating driving unit including a rotary shaft provided at the center of rotation and a driving pin provided at a position offset with respect to this rotary shaft for positioning and rotationally driving the disc.

BACKGROUND ART

Up to now, a disc recording and/or reproducing apparatus, in which a disc cartridge housing therein a magnetic disc comprising a thin film-shaped disc substrate as a signal recording layer, has been in use.

The disc cartridge, used for this disc recording and/or reproducing apparatus, is loaded on a main body portion of the apparatus as the magnetic disc is housed therein. The magnetic disc, housed in the disc cartridge, is loaded on disc table of a disc rotating driving unit provided on the recording and/or reproducing apparatus. The magnetic disc loaded on the disc table is run in rotation in unison with the disc table and has its signal recording region scanned by a magnetic head provided on the recording and/or reproducing apparatus to record and/or reproduce information signals.

If, in the above-described disc recording and/or reproducing apparatus, employing the magnetic disc as the recording medium, the information signals are to be recorded and/or reproduced correctly, it is necessary that the magnetic disc rotationally driven as it is correctly positioned on the disc table is scanned by the magnetic head to enable the recording track cut on the magnetic disc to correctly scan the recording track having information signals recorded thereon.

So, the magnetic disc and the disc rotating driving unit for loading the magnetic disc thereon are provided with a mechanism for correctly positioning the magnetic disc and for loading it in position on the disc table.

The mechanism for positioning and rotationally driving the magnetic disc is provided with a driving pin at an offset position from the rotary shaft of the disc rotating driving unit and with a metallic hub having a rotary shaft inserting opening engaged by a rotary shaft of the disc rotating driving unit and a driving pin engagement opening engaged by a driving pin.

The disc table of the disc rotating driving unit has a magnet for magnetically attracting a hub at the center portion of the magnetic disc.

When inserted into the disc recording and/or reproducing apparatus, the disc cartridge, having housed therein the magnetic disc carrying a hub having in turn the rotary shaft inserting opening and the driving pin engagement opening, is loaded in position on a cartridge loading unit provided in the recording and/or reproducing apparatus. When the disc cartridge is loaded in the cartridge loading unit, the magnetic disc housed in the disc cartridge is set on the disc table of the disc rotating driving unit as the disc hub is attracted by the magnet. At this time, the rotary shaft of the disc rotating driving unit is inserted at least into the rotary shaft inserting opening of the disc hub.

When a spindle motor of the disc rotating driving unit is run in rotation, the disc table is run in rotation prior to rotation of the magnetic disc, with the driving pin engaging in the driving pin engagement opening of the disc hub. When the disc table is further run in rotation, the driving pin is abutted against the outer peripheral surface of the rotary shaft to set the rotating position of the magnetic disc so that the disc will be rotated about the rotary shaft as the center of rotation.

In the disc rotating driving unit in which magnetic disc is run in rotation as it is positioned relative to the disc table by having the rotary shaft and the driving pin engaged with the disc hub, it is necessary for the rotary shaft and the driving pin to be reliably introduced into and engaged with the rotary shaft inserting opening and the driving pin engagement opening, provided in the disc hub, respectively.

Meanwhile, in certain disc recording and/or reproducing apparatus, employing the disc cartridge, a disc loading mechanism is used to load the disc cartridge. In this disc loading mechanism, the disc cartridge inserted into the main body portion of the recording and/or reproducing apparatus is moved in the horizontal direction perpendicular to the rotary shaft of the disc rotating driving unit and in the vertical direction parallel thereto for loading the magnetic disc housed in the disc cartridge on the disc table.

If, in such disc loading mechanism, the magnetic disc is to be unloaded, the disc cartridge is moved in the vertical direction away from the disc table and then in the horizontal direction so that a portion of the disc cartridge is placed at an insertion/ejection position. The disc cartridge, having its portion projected into a cartridge insertion/ejection opening, is again pushed into the main body portion of the apparatus to effect loading of moving the disc cartridge in the horizontal and vertical directions to enable loading of the magnetic disc onto the disc table.

The disc cartridge loaded on the disc recording and/or reproducing apparatus is ejected after the disc rotating driving unit is halted. At this time, the magnetic disc housed in the disc rotating driving unit is in such a state in which the rotary shaft and the driving pin of the disc rotating driving unit in the halted state are engaged in the rotary shaft inserting opening and in the driving pin engagement opening, respectively. If, in this state, the disc cartridge ejection operation is performed, the disc cartridge is ejected as the relative position between the rotary shaft and the driving pin on one hand and the rotary shaft inserting opening and the driving pin engagement opening on the other hand is substantially the same as that in loading.

If the disc cartridge once ejected and partially protruded via the cartridge insertion/ejection opening is again pushed into the inside of the apparatus by way of loading, such a state is obtained in which the rotary shaft and the driving pin are engaged in the rotary shaft inserting opening and the driving pin engagement opening, respectively, without accompanying disc table rotation.

However, during the ejection operation of the disc cartridge, the magnetic disc may be rotated only slightly within the disc cartridge, such that the relative position between the rotary shaft and the driving pin on one hand and the rotary shaft inserting opening and the driving pin engagement opening on the other hand is deviated even only slightly. For example, a portion of the driving pin may be overlapped with the rim of the rectangular driving pin engagement opening. If, under such condition, the disc cartridge in the ejected state is again pushed into the main body portion of the apparatus by way of loading, the disc may be loaded on the disc table in such a state in which the magnetic disc be loaded on the disc table as the distal end of the driving pin simply abuts on the rim of the driving pin engagement opening without being completely engaged therein. If, in such state, the disc table is run in rotation, the disc table starts to be rotated along with the magnetic disc, without the distal end of the driving pin being completely engaged in the driving pin engagement opening, such that the magnetic disc cannot be positioned correctly to enable correct recording and/or reproduction of information signals.

The reason of occurrence of this condition is the roughening of the rim of the driving pin engagement opening due to repeated loading and to machining error.

DISCLOSURE OF THE INVENTION

It is therefore an object of the present invention to provide a disc recording and/or reproducing apparatus in which the above-mentioned problem is eliminated and in which, if the disc cartridge is once ejected and re-loaded without being taken from the disc recording and/or reproducing apparatus, the disc can be positively positioned reliably in the disc rotating driving unit and run in this state into rotation.

In one aspect, the present invention provides a recording and/or reproducing apparatus for a disc-shaped recording medium having a rotary shaft and a driving pin provided at an offset position relative to this driving shaft, the rotary shaft being passed through a rotary shaft inserting opening formed in the disc-shaped recording medium and the driving pin being engaged in a driving pin engagement opening bored in the disc-shaped recording medium to set the rotational position of the disc-shaped recording medium run in rotation to record and/or reproduce information signals, wherein the disc rotating driving unit is driven to displace the driving pin from a position in which the rotary shaft inserting opening and the driving pin engagement opening in the disc-shaped recording medium are disengaged from the rotary shaft and the driving pin, respectively, at a timing when the rotary shaft and the driving pin are not engaged in the rotary shaft inserting opening and the driving pin engagement opening in the disc-shaped recording medium, respectively.

In another aspect, the present invention provides a recording and/or reproducing apparatus for a disc-shaped recording medium adapted for recording and/or reproducing information signals for a disc-shaped recording medium housed in a disc cartridge loaded on the recording and/or reproducing apparatus, the disc-shaped recording medium having a rotary shaft inserting opening at its center and a driving pin engagement opening at a position offset from the rotary shaft inserting opening, wherein the recording and/or reproducing apparatus includes a disc rotating driving unit having a rotary shaft inserted into the rotary shaft inserting opening bored in the disc-shaped recording medium and a driving pin provided at a position offset from the rotary shaft and adapted for being engaged in the driving pin engagement opening bored in the disc-shaped recording medium, and a detection switch for detecting a state of separation of the disc cartridge from the cartridge loading portion in a main body portion of the recording and/or reproducing apparatus. The disc rotating driving unit is driven to displace the driving pin when the separation of the disc cartridge from the cartridge loading portion is detected by the detection switch.

In yet another aspect, the present invention provides a disc recording and/or reproducing apparatus adapted for recording and/or reproducing information signals for a disc-shaped recording medium housed in a disc cartridge loaded on the recording and/or reproducing apparatus, the disc-shaped recording medium having a rotary shaft inserting opening at its center and a driving pin engagement opening at a position offset from the rotary shaft inserting opening, wherein the recording and/or reproducing apparatus includes a disc rotating driving unit having a rotary shaft inserted into the rotary shaft inserting opening bored in the disc-shaped recording medium and a driving pin provided at a position offset from the rotary shaft and a adapted for being engaged in the driving pin engagement opening bored in the disc-shaped recording medium, and a detection switch for detecting a state of insertion of the disc cartridge into the cartridge loading portion in a main body portion of the recording and/or reproducing apparatus. The disc rotating driving unit is driven to displace the driving pin when the insertion of the disc cartridge into the cartridge loading portion is detected by the detection switch.

Preferably, the driving pin is rotated within a range approximately 30 to 180 about the rotary shaft as the center of rotation to shift its position.

Preferably, the rotary shaft inserting opening and the driving pin engagement opening are bored in a hub mounted centrally of the disc-shaped recording medium.

Preferably, the hub is formed of a magnetic material, and a magnet for magnetically attracting the hub is provided on the disc rotating driving unit. The magnetic disc is loaded on the disc rotating driving unit by the hub being attracted by the magnet.

Other objects and advantages of the present invention will become apparent from the following description which is made with reference to the accompanying drawings.

BEST MODE FOR CARRYING OUT THE INVENTION

A specified structure of the present invention is hereinafter explained with reference to the drawings.

Figure 1:
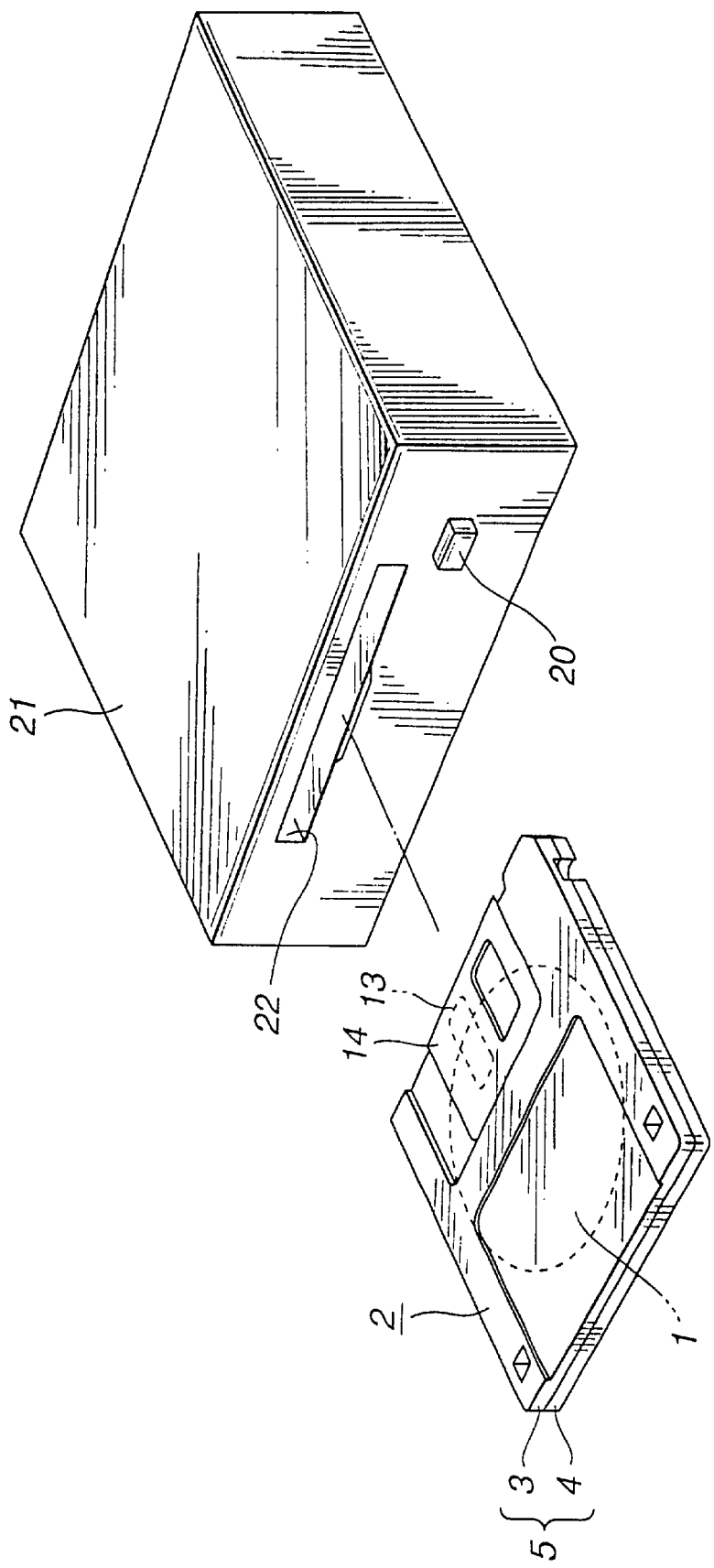
FIG. 1 is a perspective view showing a disc recording and/or reproducing apparatus of the present invention along with a disc cartridge.

Referring to FIG. 1, the disc recording and/or reproducing apparatus according to the present invention uses, as a recording medium, a disc cartridge 2 housing a magnetic disc 1 comprising a signal recording layer deposited on a thin film-shaped disc substrate, and includes, within a main body portion 21, a disc rotating driving unit, a magnetic head device for recording and/or reproducing information signals by scanning a signal recording region of the magnetic disc 1 rotationally driven by the disc rotating driving unit, and a recording and/or reproducing circuit for the information signals. The disc rotating driving unit is adapted for rotationally driving the magnetic disc 1 housed in the disc cartridge 2. Within the main body portion 21, there is mounted a disc loading mechanism for holding the disc cartridge 2 inserted into the main body portion 21 via a cartridge insertion/ejection opening 22 provided in the front surface of the main body portion 21 and for causing movement of the disc cartridge in the horizontal direction perpendicular to the rotary shaft of the disc rotating driving unit and in the vertical direction parallel to the rotary shaft to load the magnetic disc 1 housed in the disc cartridge 2 on the disc table.

The front side of the main body portion 21 is provided with an ejection button 20 for actuating an ejection mechanism used for ejecting the magnetic disc loaded on the disc table along with the disc cartridge 2 for protruding the disc cartridge 2 at the cartridge insertion/ejection opening 22.

Since the structure of the disc recording and/or reproducing apparatus is well-known and hence is not explained in detail.

Figure 2:
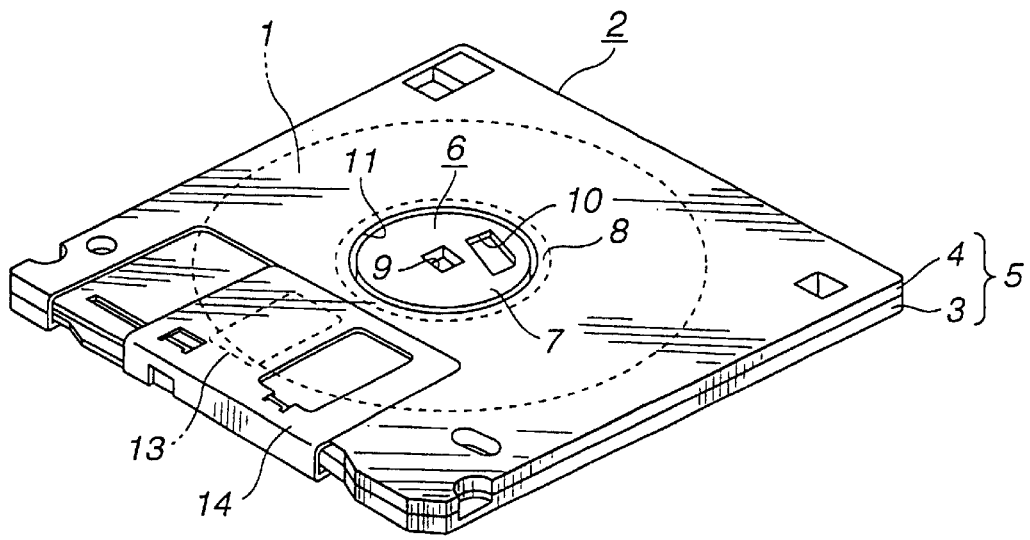
FIG. 2 is a perspective view showing the bottom surface side of a disc used in the disc recording and/or reproducing apparatus according to the present invention.

Turning to the detailed structure of the disc cartridge 2, used in this disc recording and/or reproducing apparatus, this disc cartridge 2 rotationally houses the magnetic disc 1 in a rectangular main cartridge body portion 5, obtained on abutting and interconnecting an upper cartridge half 3 and a lower cartridge half 4, as shown in FIGS. 1 and 2.

The magnetic disc 1, housed in the disc cartridge 2, is constituted by depositing a signal recording layer of a magnetic material on a thin film-shaped disc substrate formed of e.g., polyester. Centrally of the magnetic disc 1 is formed a hub 6 for clamping the magnetic disc 1 with respect to the disc rotating driving unit provided within the main body portion of the recording and/or reproducing apparatus, as shown in FIG. 2. This hub 6 is formed by punching a thin metal sheet as a magnetic material and has a tubular center projection 7. On the outer rim of the distal end side is formed a flange 8. The hub 6 is mounted on the magnetic disc 1 by introducing the projection 7 into a center opening 9 of the magnetic disc 1 and by bonding the flange 8 to the rim of the center opening 9 with an adhesive. Centrally of the hub 6 is formed a square-shaped rotary shaft inserting opening 9, and a rectangular driving pin engagement opening 10 is bored at an offset position from the rotary shaft inserting opening 9, as shown in FIG. 2. The driving pin engagement opening 10 is inclined with respect to the rotary shaft inserting opening 9.

Centrally of the lower cartridge half 4 making up the lower surface of the main cartridge body portion 5 housing the magnetic disc 1 is formed a circular center opening 11. The magnetic disc 1 is rotatably housed in the main cartridge body portion 5 so that the hub 6 will face the outside through the center opening 11. The main cartridge body portion 5 has recording and/or reproducing apertures 12, 13 in its upper and lower sides for facing each other and for exposing the signal recording region of the magnetic disc 1 to outside across the inner and outer rims of the disc. These apertures 12, 13 are formed in rectangular form at a width-wise mid portion of the main cartridge body portion 5 for extending from the vicinity of the center of the main cartridge body portion 5 to a lateral side thereof. The recording and/or reproducing apertures 12, 13 are opened/closed by a shutter member 14 mounted for movement along a lateral side of the main cartridge body portion 5. The shutter member 14 is moved in association with the insertion and ejection of the disc cartridge 2 into or from the disc recording and/or reproducing apparatus for opening/closing the recording and/or reproducing aperture 12.

On the inner surface of the main cartridge body portion 5 is arranged a liner sheet of e.g., a non-woven cloth for protecting the magnetic disc 1 housed within the main cartridge body portion 5. In between the liner sheet and the main cartridge body portion 5 is arranged a spring plate for contacting the liner sheet with the magnetic disc 1. By the liner sheet contacting the magnetic disc 1, the latter may be rotated and cleaned by the liner sheet to prevent affixture of contaminations. The magnetic disc 1, contacting the liner sheet, is restrained from free rotation under the force of friction.

Figure 3:
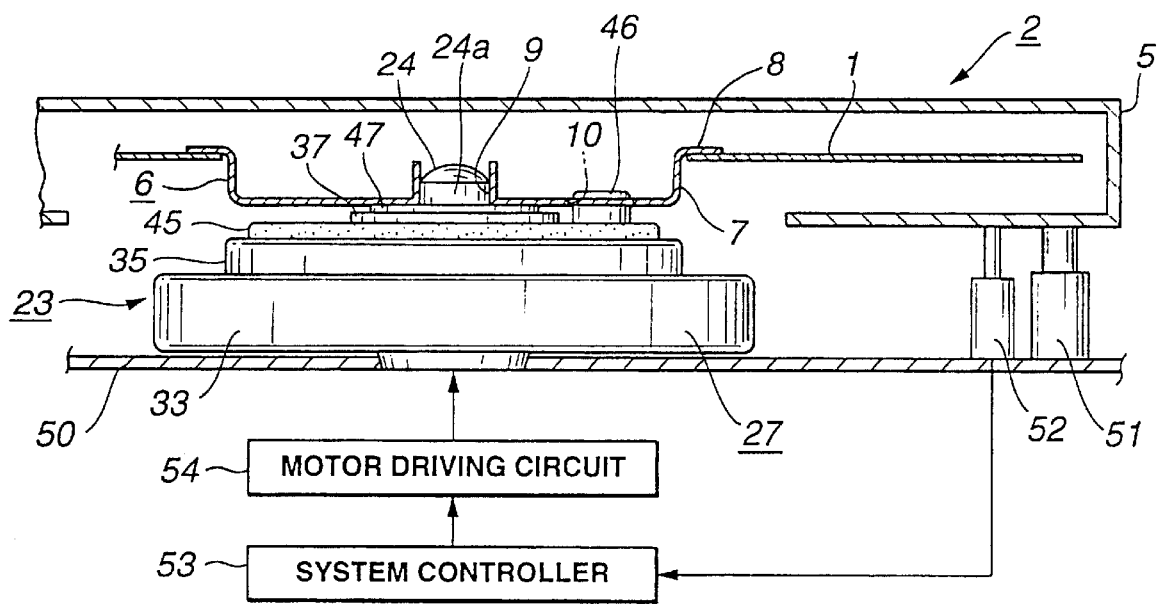
FIG. 3 is a side view showing, along with a controller for controlling the driving of a spindle motor, the state in which a magnetic disc housed in the disc cartridge has been loaded on the disc rotating driving unit.
Figure 4:
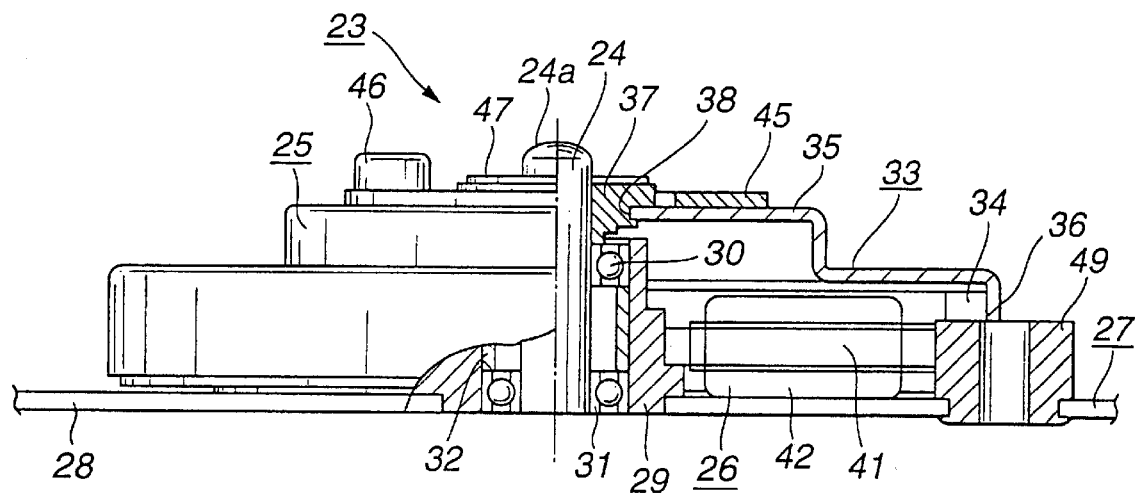
FIG. 4 is a side view showing a disc rotating driving unit adapted for rotationally driving the magnetic disc housed in the disc cartridge, with a portion being broken away.

A disc rotating driving unit 23, arranged in the disc recording and/or reproducing apparatus, on which is loaded the disc cartridge 2 housing the magnetic disc 1 as described above, is provided with a spindle motor 27 having a rotor 25 and a stator 26, as shown in FIGS. 3 and 4. The rotor 25 includes a center rotary shaft 24. This rotary shaft 24 is introduced into the rotary shaft inserting opening 9 bored in the center of the hub 6 mounted on the magnetic disc 1 housed in the disc cartridge 2.

The rotary shaft 24, provided centrally of the rotor 25, is rotatably supported through a pair of bearings 30, 31 mounted on the inner rim of a tubular bearing housing 29 mounted upright on a motor base 28. These bearings 30, 31 are bonded through an adhesive to the inner peripheral surface of the bearing housing 29. In between the bearings 30, 31 is interposed a spacer 32 for setting the mounting position in the axial position of the rotary shaft 24.

The motor base 28 is formed by a steel plate having a zinc plating layer on its surface.

The rotor 25 is made up of a rotor casing 33, formed of a magnetic material, such as a steel plate, having a zinc plating layer on its surface, and a rotor magnet 34. The rotor casing 33 is formed as a cylinder having a center projecting step 35 which is protruded as a cylinder towards the distal end of the rotary shaft 24 for constituting a disc table. On the inner peripheral surface of an outermost peripheral wall 36 is bonded a ring-shaped rotor magnet 34 with an adhesive. The rotor magnet 34 is magnetized alternately to N and S poles along its circumferential direction.

The rotor casing 33, carrying the rotor magnet 34, is mounted for rotation in unison with the rotary shaft 24, by fitting a rotor mounting portion 37 making up a disc setting portion mounted as one with the distal end of the rotary shaft 24 fitted in a fitting opening 38 bored centrally of the projecting step 35.

The stator 26, constituting the spindle motor 27 along with the rotor 25, is formed by placing a winding 42 about an iron core 41 formed by layering plural magnetic plates, such as silicon steel plates. This stator 26 is mounted by fitting a ring-shaped iron core 41 on the outer rim of the bearing housing 29 so that the stator 26 will be located on the inner rim side of the rotor casing 33. The wiring 42 is extended in the radial direction of the ring-shaped iron core 41 for facing the rotor magnet 34.

With the spindle motor 27, arranged as described above, the driving current is supplied from the power source to the winding 42 of the stator 26 through a wiring arranged on the motor base 28, whereby the rotor 25 is rotationally driven in unison with the rotary shaft 24.

On the distal end of the projecting step 35 formed centrally of the rotor casing 33 of the spindle motor 27, constructed as described above, there is mounted a chuck magnet 45 for magnetically attracting the hub 6 provided centrally of the magnetic disc 1. This chuck magnet 45 is formed of an elastic rubber to an arcuate shape and is bonded with an adhesive to the distal end of the projecting step 35 for encircling the rotary shaft 24.

On the projecting step 35 is mounted a driving pin 46 at an offset position relative to the rotary shaft 24 to constitute the disc rotating driving unit 23. This driving pin 46, engaged in the driving pin engagement opening 10 offset from the center of the hub 6 mounted on the magnetic disc 1 housed in the disc cartridge 2, has its distal end projected from the projecting step 35. This driving pin 46 is biased towards the outer rim of the projecting step 35 by a biasing member, such as a tension spring, not shown, such that, when the driving pin 46 is engaged in the driving pin engagement opening 10, the driving pin 46 compresses against an outer peripheral side corner of the driving pin engagement opening 10 to bias the magnetic disc 1 towards the outer periphery of the projecting step 35, about the rotary shaft 24 as center.

On the distal end face of the rotor mounting portion 37 of a disc setting unit is arranged a disc seat 47 operating for producing slip between the hub 6 of the magnetic disc 1 and the rotor mounting portion 37 when the rotor 25 is rotated prior to rotation of the magnetic disc 1 so that the driving pin 46 will be engaged in the driving pin engagement opening 10. The disc seat 47 is formed by a lubricious film of synthetic resin, such as ethylene tetrafluoride.

The disc rotating driving unit 23, constructed by the above-described spindle motor 27, is mounted on a base 50 arranged in the main body portion 21 through a supporting pillar 49 mounted around the motor base 28.

When the disc cartridge 2 is introduced through the cartridge insertion/ejection opening 22 into the main body portion 21, having the disc rotating driving unit 23 arranged therein, the disc cartridge 1 is held by a cartridge holder constituting the disc loading mechanism provided in the main body portion 21.

The disc cartridge 2 is introduced into the inside of the main body portion 21, with its lateral side carrying the shutter member 14 as its leading end. As the disc cartridge 2 is introduced into the main body portion 21 so as to be held by the cartridge holder, the shutter member 14 is moved by a shutter opening/closing mechanism provided on the cartridge holder in a direction of opening the recording and/or reproducing apertures 12, 13.

When the disc cartridge 2 is inserted into the cartridge holder, the latter is released from its locked state by the disc cartridge 2 and is lowered towards the base 50 along with the disc cartridge 2. That is, the disc cartridge 2 is moved in a vertical direction parallel to the rotary shaft 24 of the disc rotating driving unit 23, along with the circuit holder, until it is supported by a positioning pin 51 set upright on the base 50, by way of loading the disc cartridge in position on a cartridge loading portion arranged on the base 50, as shown in FIG. 4.

The disc recording and/or reproducing apparatus includes a cartridge detection switch 52 for detecting that the disc cartridge 2 has been loaded on the base 50, or that the disc cartridge 2 has been ejected from the cartridge loading portion, as shown in FIG. 3.

When the disc cartridge 2 is lowered so as to be supported by the positioning pin 51, a cartridge detection switch 52 is thrust by the cartridge 2 to detect the loading of the disc cartridge 2 on the cartridge loading portion. On detection of the loading of the disc cartridge 1 by the cartridge detection switch 52, a corresponding detection output is inputted to a system controller 53 controlling the operation, such as the recording and/or reproducing operation, of the disc recording and/or reproducing apparatus. On reception of the cartridge detection output, the system controller 53 drives the spindle motor 27 through a motor driving circuit 54.

Meanwhile, when the disc cartridge 2 is loaded on the cartridge loading portion, the projecting step 35 provided on the rotor 25 of the spindle motor 27 is intruded into the inside of the main cartridge body portion 5 through the center opening 11. When the projecting step 35 is intruded into the inside of the main cartridge body portion 5, the chuck magnet 45 approaches to and attracts the hub 6 provided on the magnetic disc 1. By being attracted by the chuck magnet 45, the hub 6 is set on the rotor mounting portion 37, having the disc seat 47 on its distal end face, with at least the rotary shaft inserting opening 9 being then passed through by the rotary shaft 24.

Figure 5:
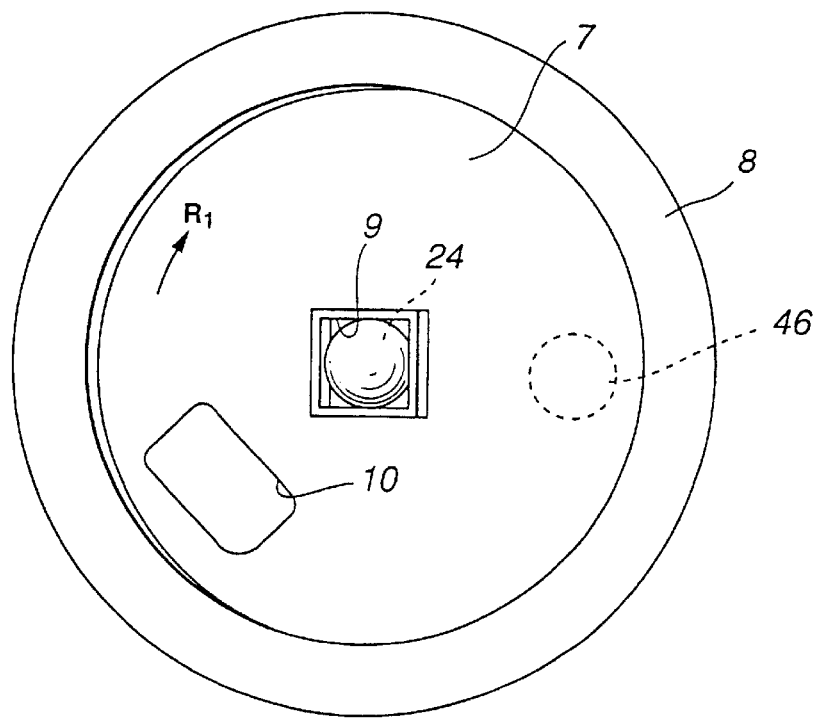
FIG. 5 is a plan view showing the state of chucking the magnetic disc to the disc rotating driving unit.

In a majority of magnetic discs 1, the hub 6 rests on the projecting step 35 in such a state in which the driving pin engagement opening 10 provided in the hub 6 is offset relative to the driving pin 46 provided on the rotor 33, as shown in FIG. 5. If the spindle motor 27 starts to be driven in such state, only the rotor 25 is rotated in the direction indicated by arrow R1 in FIG. 5, prior to the rotation of the magnetic disc 1. By the rotor 33 rotating ahead of the magnetic disc 1, the driving pin 46 is engaged in the driving pin engagement opening 10, as shown in FIG. 3. When the driving pin 46 is engaged in the driving pin engagement opening 10, the hub 6 tightly contacts the disc seat 47, with the magnetic disc 1 being set in the horizontal state on the projecting step 35, as shown in FIG. 3.

When the driving pin 46 is engaged with the riving pin engagement opening 10, and the spindle motor 23 is driven further, the driving pin 46 compresses against the corner on the outer rim side of the driving pin engagement opening 10 to bias the hub 6 towards the outer rim side of the rotor 25, about the rotary shaft 24 as center, for setting the rotational position of the magnetic disc 1 such that the magnetic disc 1 will be rotated about the rotary shaft 24 as the center of rotation. By the magnetic head device scanning the signal recording region of the magnetic disc 1, rotated in a fixed rotating position, the recording track formed in the signal recording region may be correctly scanned by the magnetic head device to realize correct recording and/or reproduction of information signals.

When the recording and/or reproduction of information signals on or from the magnetic disc 1 comes to a close, and a stop button is pressed, the spindle motor 27 is halted, so that the rotation of the magnetic disc 1 ceases. If, after the halting of the spindle motor 27, an ejection button 20 is pushed, a cartridge holder holding the disc cartridge 1 is uplifted away from the base 50. As the cartridge holder is moved away from the base 50, the disc cartridge 2 held by the cartridge holder also is moved away from the disc rotating driving unit 23. The magnetic disc 1 housed in the disc cartridge 2 is spaced apart from the projecting step 35, with the rotary shaft inserting opening 9 and the driving pin engagement opening 10 being disengaged from the rotary shaft 24 and the driving pin 46, respectively.

When the cartridge holder is uplifted to a position spaced apart from the base 50, the disc cartridge 2 is moved in a direction of being ejected from the cartridge holder, by an ejection mechanism, until the disc cartridge is partially protruded via the cartridge insertion/ejection opening 22. By gripping and pulling the projecting portion of the disc cartridge 2 from the cartridge insertion/ejection opening 22, the disc cartridge 2 is completely ejected from the main body portion of the recording and/or reproducing apparatus. If the disc cartridge 2, partially projected through the cartridge insertion/ejection opening 22, is again introduced into the inside of the main body portion 21, it is held by the cartridge holder to descend therewith towards the base 50 until it is loaded on the cartridge loading unit and set on the projecting step 35 of the rotor 25.

Meanwhile, when the disc cartridge 1 is acted on for ejection, the relative position between the rotary shaft 24 and the driving pin 46 on one hand and the rotary shaft inserting opening 9 and the driving pin engagement opening 10 on the other hand remains the same as that in loading. That is, the magnetic disc 1 contacts the liner sheet arranged in the main cartridge body portion 5 and hence is restrained from free rotation. In the case of the disc cartridge 1 not provided with the liner sheet, the magnetic disc 1 contacts the inner surface of the main cartridge body portion 5 so that its free rotation is restricted by the force of friction between the magnetic disc 1 and the main cartridge body portion 5. In the spindle motor 27, the rotor magnet 34 is magnetically attracted by the iron core 41 of the stator 26, so that the rotor 25 is maintained in its ejected position.

When the disc cartridge 1, once acted on for ejection and partially projected through the cartridge insertion/ejection opening 22 in the main body portion 21, is again pushed into the main body portion 21, byway of loading, the rotary shaft 24 and the driving pin 46 on one hand and the rotary shaft inserting opening 9 and the driving pin engagement opening 10 on the other hand are engaged with each other without accompanying rotation of the rotor 25.

Figure 6:
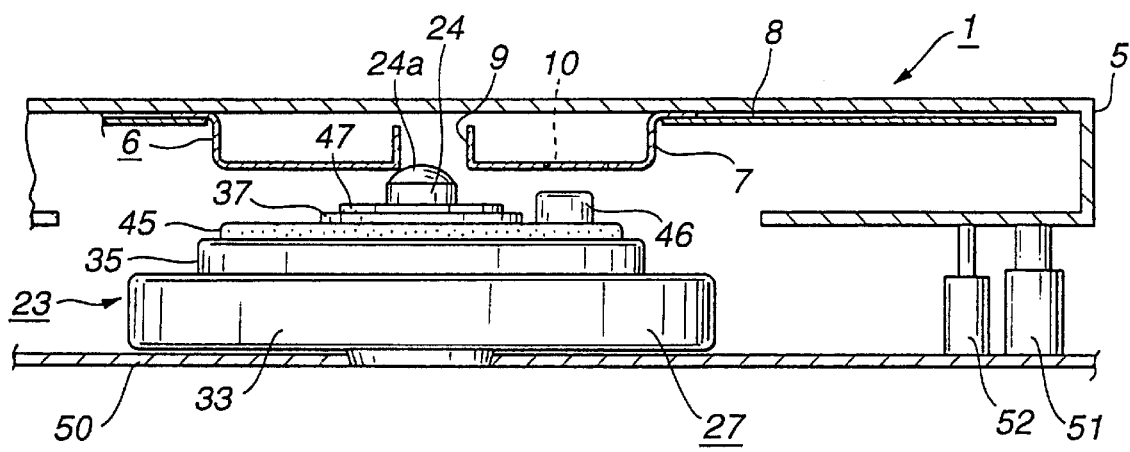
FIG. 6 is a side view showing the state in which the disc cartridge has been loaded on the cartridge loading unit, or the state in which the disc cartridge is ejected from the cartridge loading unit.

When the disc cartridge 1 is acted upon for ejection, the magnetic disc 1 is slightly rotated within the main cartridge body portion 5, by the oscillations applied to the disc cartridge 1, or is shifted in its position in the radial direction in the main cartridge body portion 5, such that the relative position between the rotary shaft 24 and the driving pin 46 on one hand and the rotary shaft inserting opening 9 and the driving pin engagement opening 10 on the other hand are changed only slightly, as shown in FIG. 6. For example, part of the driving pin 46 may be overlapped with the rim of the rectangular driving pin engagement opening 10. If, in such state, the disc cartridge in the ejected state is again pushed into the inside of the main cartridge body portion 21, and is lowered towards the cartridge loading section provided on the base 50 so as to be supported on the positioning pin 52, by way of loading, such a state may be produced in which, as shown in FIGS. 7 and 8, the foremost part of the driving pin 46 is not completely engaged in the driving pin engagement opening 10 but simply rests on its rim portion, with the magnetic disc 1 being set in this position on the projecting step 35 of the rotor 33.

Meanwhile, an arcuate inserting guide 24a is formed at the distal end of the driving shaft 24, so that, if the driving shaft 24 is overlapped only partially with the driving shaft inserting opening 9, the driving shaft 24 is passed through the driving shaft inserting opening 9 under guidance by the inserting guide 24a.

In particular, if, as a result of repeated pressure engagement of the driving pin 46 in the driving pin engagement opening 10, the peripheral surface of the driving pin engagement opening 10 tends to be roughed. Moreover, if minor projections are produced on the peripheral surface of the driving pin engagement opening 10, due to machining errors etc of the driving pin engagement opening 10, the minor projections are abutted against the distal end of the driving pin 46, with the result that such a state is sustained in which the distal end of the driving pin 46 simply abuts on the rim of the driving pin engagement opening 10 without being completely engaged in the driving pin engagement opening 10.

Figure 7:
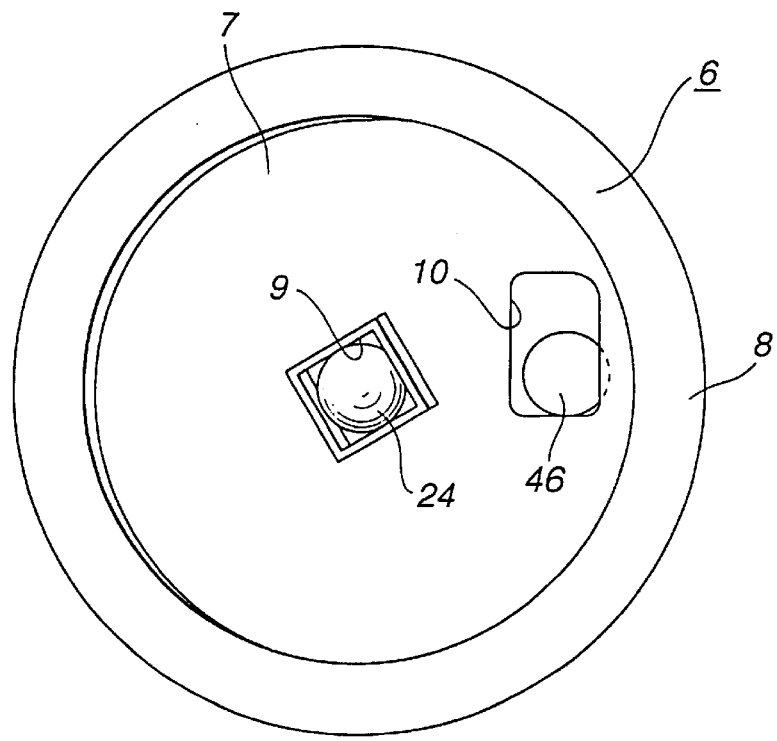
FIG. 7 is a plan view showing the state in which a portion of a driving pin on the disc rotating driving unit compresses against the rim of a driving pin engagement opening of a hub mounted on a magnetic disc.
Figure 8:
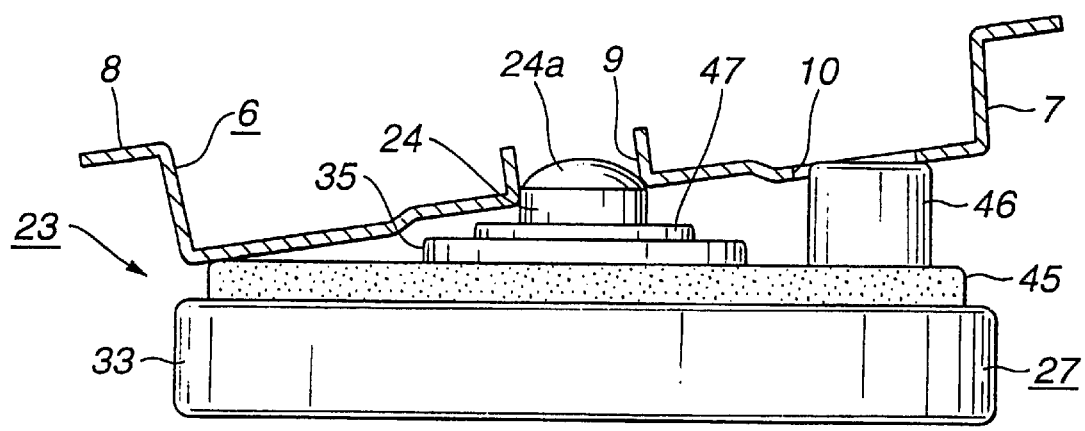
FIG. 8 is a cross-sectional view thereof.

If, in this state, the spindle motor 27 begins to be run in rotation, the magnetic disc 1 is not subjected to offsetting with respect to the rotor 25, with the distal end of the driving pin 46 not being completely engaged in the driving pin engagement opening 10 but simply compressing against the rim of the opening 10, such that the magnetic disc 1 is rotated in unison with the rotor 25, with the driving shaft 24 not engaging in the driving pin engagement opening 10, as shown in FIGS. 7 and 8. As a result, the magnetic disc 1 is run in rotation without the magnetic disc 1 being positioned about the driving pin 46 as center.

If, in the disc recording and/or reproducing apparatus according to the present invention, the disc cartridge loaded on the cartridge loading unit in the halted state of the spindle motor 27 is acted on for ejection, such that the disc cartridge 1 is moved away from the base 50 until the rotary shaft 24 and the driving pin 46 are detached from the rotary shaft inserting opening 9 and the driving pin engagement opening 10, respectively, the cartridge detection switch 52, so far thrust by the disc cartridge 1, ceases to be thrust thereby. When the cartridge detection switch 52 ceases to be thrust by the disc cartridge 1, a detection output indicating the ejection of the disc cartridge 1 is issued and inputted to a system controller 53. When the system controller 53 is fed with the ejection detection output of the disc cartridge 1, the spindle motor 23 is slightly rotated by a motor driving circuit 54. The rotational angle of this spindle motor 27 is such an angle that, when the disc cartridge 1 partially protruded into the cartridge insertion/ejection opening 22 of the main cartridge body portion 21 is re-loaded on the cartridge loading unit, the distal end of the driving pin 46 is not overlapped with the rim of the driving pin engagement opening 10 of the hub 6 provided on the magnetic disc 1 displaced due to e.g., vibrations in the main cartridge body portion 5, and is specifically in a range from approximately 30 to 180.

If, when the disc cartridge 1 is acted on for ejection, the spindle motor in the halted state is rotated partially at least through an angle of approximately 30 to 180, there is produced such a state in which the driving pin engagement opening 10 bored in the hub 6 provided on the magnetic disc 1, not rotated significantly in the main cartridge body portion 5, and the driving pin 46, are offset significantly relative to each other, as shown in FIG. 5.

Since the driving pin engagement opening 10 of the hub 6 is significantly offset in its relative position to the driving pin 46, when the disc cartridge 2 is acted on for ejection and the disc cartridge 2 partially protruded into the cartridge insertion/ejection opening 22 of the main cartridge body portion 21 is again pushed into the main cartridge body portion 21 by way of loading, the magnetic disc 1 rests on the projecting step 35 as the driving pin engagement opening 10 bored in the hub 6 is offset relative to the driving pin 46 provided on the rotor 25, as shown in FIG. 5. That is, the distal end of the driving pin 46 compresses against the flat end face of the hub 6, without the distal end of the driving pin 46 overlapping with the rim of the driving pin engagement opening 10.

When the spindle motor 23 commences to be rotated in this state, only the rotor 25 is rotated in the direction indicated by arrow R1 in FIG. 5 ahead of the magnetic disc 1, as the distal end of the driving pin 46 has a sliding contact with the distal end face of the hub 6. With the rotor 33 rotating ahead of the magnetic disc 1, the driving pin 46 is engaged in the driving pin engagement opening 10, as shown in FIG. 3. When the driving pin 46 is engaged in the driving pin engagement opening 10, the hub 6 is brought into intimate contact with the disc seat 47, with the magnetic disc 1 being set in a horizontal state on the projecting step 35.

When the driving pin 46 is engaged in the driving pin engagement opening 10, and the spindle motor 27 is rotated further, the hub 6 is biased towards the outer rim of the rotor 25, about the rotary shaft 24 as center, as the driving pin 46 is brought into pressure engagement with the outer peripheral side corner of the driving pin engagement opening 10, and as the rotary shaft inserting opening 9 is in pressure contact with the rotary shaft 24, whereby the magnetic disc 1 has its rotary position set so that the disc will be rotated about the rotary shaft 24 as the center of rotation. By the magnetic head device scanning the signal recording region of the magnetic disc 1, rotating in a fixed rotating position, the recording track formed in the signal recording region is accurately scanned by the magnetic head device to realize accurate recording and/or reproduction of information signals.

By rotating the spindle motor 27, halted in association with the ejecting operation of the disc cartridge 2, through a small angle less than a complete revolution, the distal end of the driving pin 46 can be abutted against the flat end face of the hub 6, without the distal end of the driving pin 46 being overlapped with the rim of the driving pin engagement opening 10, even if the partially ejected disc cartridge 2 is intruded into the cartridge insertion/ejection opening 22 of the main cartridge body portion 21, by way of loading, thus positively setting the magnetic disc 1 in position in the disc rotating driving unit 23 by way of loading.

If the spindle motor 27 is rotated slightly in association with the ejecting operation of the disc cartridge 2, and a disc cartridge 2 distinct from the ejected disc cartridge 2 is loaded, it may be an occurrence that the distal end of the driving pin 46 is overlapped with the rim of the driving pin engagement opening 10.

However, if the disc cartridge is once acted on for ejection and partially protruded into the cartridge insertion/ejection opening 22 in the main cartridge body portion 21 is again pushed into the main cartridge body portion 21 by way of loading, the state of the distal end of the driving pin 46 overlapping with the rim of the driving pin engagement opening 10 may be evaded to render it possible to reduce the checking error of the disc with respect to the disc rotating driving unit 23 significantly as compared to that encountered in a conventional disc recording and/or reproducing apparatus.

In the above-described disc recording and/or reproducing apparatus, the spindle motor 27 is rotated in association with the ejecting operation of the disc cartridge 2 to prevent the distal end of the driving pin 46 from being overlapped with the rim of the driving pin engagement opening 10. However, it is also sufficient if the spindle motor 27 is rotated slightly at a pre-set timing when the magnetic disc 1 is not loaded on the disc rotating driving unit 23. For example, it suffices if the spindle motor 27 is rotated as described above on power up when the disc cartridge 2 is just about to be loaded in position. In addition, it suffices if a detection switch is provided which detects that the disc cartridge 2 has been held in position on the cartridge holder and if the spindle motor 27 is rotated slightly when the detection switch is acted on by the disc cartridge inserted into the cartridge holder.

In the above-described example, the position of the disc cartridge 2 is detected to control the driving of the spindle motor 27 constituting the disc rotating driving unit 23. It is however also possible to detect the position of the magnetic disc 1 relative to the disc rotating driving unit 23 to detect whether or not the magnetic disc 1 has been loaded on the disc rotating driving unit 23. In such case, detection means for detecting the position of the magnetic disc 1 is provided on a rotor 33 constituting the spindle motor 27 or on the projecting step 35 formed on the rotor 33. This detection means detects whether the hub provided on the magnetic disc 1 rests on the disc seat 47 or is separate a pre-set distance from the disc seat 47 to detect whether or not the rotary shaft inserting opening 9 and the driving pin engagement opening 10 are disengaged from the rotary shaft 24 and the driving pin 46 on the side of the disc rotating driving unit 23, respectively.

The present invention may also be applied to a disc recording and/or reproducing apparatus employing a disc in which the rotary shaft and a driving pin provided at an offset position relative to the rotary shaft are engaged with the disc or with the hub provided thereon to set the rotational position of the disc to achieve the favorable results similar to those described above.

INDUSTRIAL APPLICABILITY

Since the present invention provides a disc recording and/or reproducing apparatus in which a rotary shaft and a driving pin provided at an offset position relative to the rotary shaft are inserted and engaged in the disc to set the rotational position of the disc to run the disc into rotation, with the driving pin not overlapping with the rim of the driving pin engagement opening, the disc rotating driving unit can be rotated ahead of the disc to positively engage the driving pin in the driving pin engagement opening. The result is that the disc is run in rotation in a correct position relative to the rotary shaft of the disc rotating driving unit to enable correct recording and/or reproduction of information signals.

What is claimed is:

1. A recording and/or reproducing apparatus for a disc-shaped recording medium adapted for recording and/or reproducing information signals for a disc-shaped recording medium housed in a disc cartridge loaded on the recording and/or reproducing apparatus, said disc-shaped recording medium having a rotary shaft inserting opening at its center and a driving pin engagement opening at a position offset from said rotary shaft inserting opening;

said recording and/or reproducing apparatus comprising:
a disc rotating driving unit having a rotary shaft inserted into said rotary shaft insertion opening bored in said disc-shaped recording medium and a driving pin provided at a position offset from said rotary shaft and adapted for being engaged in said driving pin engagement opening bored in said disc-shaped recording medium; and
a detection switch for detecting a state of separation of said disc cartridge from said cartridge loading portion in a main body portion of the recording and/or reproducing apparatus;

said disc rotating driving unit being driven to displace said driving pin when the separation of said disc cartridge from said cartridge loading portion is detected by said detection switch.

2. The recording and/or reproducing apparatus for a disc-shaped recording medium according to claim 1 wherein said detection switch detects the loading of said disc cartridge on said cartridge loading unit as well as the separation of said disc cartridge from the cartridge loading portion.

3. The recording and/or reproducing apparatus for a disc-shaped recording medium according to claim 1 wherein said driving pin is rotated within a range not more than one complete revolution about said rotary shaft as the center of rotation to shift its position.

4. The recording and/or reproducing apparatus for a disc-shaped recording medium according to claim 1 wherein said driving pin is rotated within a range approximately 30° to 180° about said rotary shaft as the center of rotation to shift its position.

5. The recording and/or reproducing apparatus for a disc-shaped recording medium according to claim 1 wherein said rotary shaft inserting opening and the driving pin engagement opening are bored in a hub mounted centrally of said disc-shaped recording medium.

6. The recording and/or reproducing apparatus for a disc-shaped recording medium according to claim 5 wherein said hub is formed of a magnetic material and a magnet is provided on said disc rotating driving unit for magnetically attracting said hub.

* * * * *

UNITED STATES PATENT AND TRADEMARK OFFICE
CERTIFICATE OF CORRECTION

PATENT NO.      : 6,584,056 B1
DATED           : June 24, 2003
INVENTOR(S)     : Hidekuni Aizawa et al.

It is certified that error appears in the above-identified patent and that said Letters Patent is hereby corrected as shown below:

Title page,
Item [54], replace "DISK RECORDING AND/OR REPRODUCING DEVICE" with -- DISK RECORDING AND/OR REPRODUCING APPARATUS --.

Column 12,
Line 58, replace "insertion" with -- inserting --.

Signed and Sealed this

Twenty-third Day of December, 2003

JAMES E. ROGAN
*Director of the United States Patent and Trademark Office*